United States Patent
Watanabe

(10) Patent No.: US 7,982,895 B2
(45) Date of Patent: Jul. 19, 2011

(54) IMAGE COMMUNICATION APPARATUS AND METHOD FOR CONTROLLING IMAGE COMMUNICATION APPARATUS

(75) Inventor: Akinori Watanabe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 856 days.

(21) Appl. No.: 11/956,077

(22) Filed: Dec. 13, 2007

(65) Prior Publication Data

US 2008/0151296 A1    Jun. 26, 2008

(30) Foreign Application Priority Data

Dec. 21, 2006   (JP) ................. 2006-344395

(51) Int. Cl.
*G06F 3/12* (2006.01)
(52) U.S. Cl. ..................... 358/1.15; 358/1.16
(58) Field of Classification Search ............. 358/400, 358/401, 404, 444, 434, 435, 436, 474, 471, 358/407; 379/100.01, 100.09
See application file for complete search history.

(56) References Cited

U.S. PATENT DOCUMENTS

| | | | | |
|---|---|---|---|---|
| 4,994,926 A | * | 2/1991 | Gordon et al. ............ | 358/400 |
| 5,086,426 A | * | 2/1992 | Tsukakoshi et al. ....... | 370/405 |
| 5,237,428 A | * | 8/1993 | Tajitsu et al. ............ | 358/440 |
| 2006/0059232 A1 | * | 3/2006 | Yoshikawa ............... | 709/206 |
| 2006/0290997 A1 | * | 12/2006 | Okada et al. ............. | 358/403 |
| 2007/0165274 A1 | * | 7/2007 | Maeda .................... | 358/1.15 |
| 2008/0095151 A1 | * | 4/2008 | Kawazoe et al. .......... | 370/389 |
| 2009/0323100 A1 | * | 12/2009 | Lee ....................... | 358/1.15 |

FOREIGN PATENT DOCUMENTS

JP    2005-94662 A    4/2005

OTHER PUBLICATIONS

U.S. Appl. No. 11/956,577, filed Dec. 14, 2007, Image Communication Apparatus and Method for Controlling Image Communication Apparatus, Inventor Akinori Watanabe.

* cited by examiner

*Primary Examiner* — Jerome Grant, II
(74) *Attorney, Agent, or Firm* — Canon U.S.A., Inc. I.P. Division

(57) ABSTRACT

An image communication apparatus is capable of communicating with external apparatuses. The image communication apparatus receives image data from a first external apparatus and stores the received image data in a storage unit. Upon receiving a request from a second external apparatus, the image communication apparatus identifies the image data that was destined for the second external apparatus among the image data stored in the storage unit and transfers the identified image data to the second external apparatus.

4 Claims, 14 Drawing Sheets

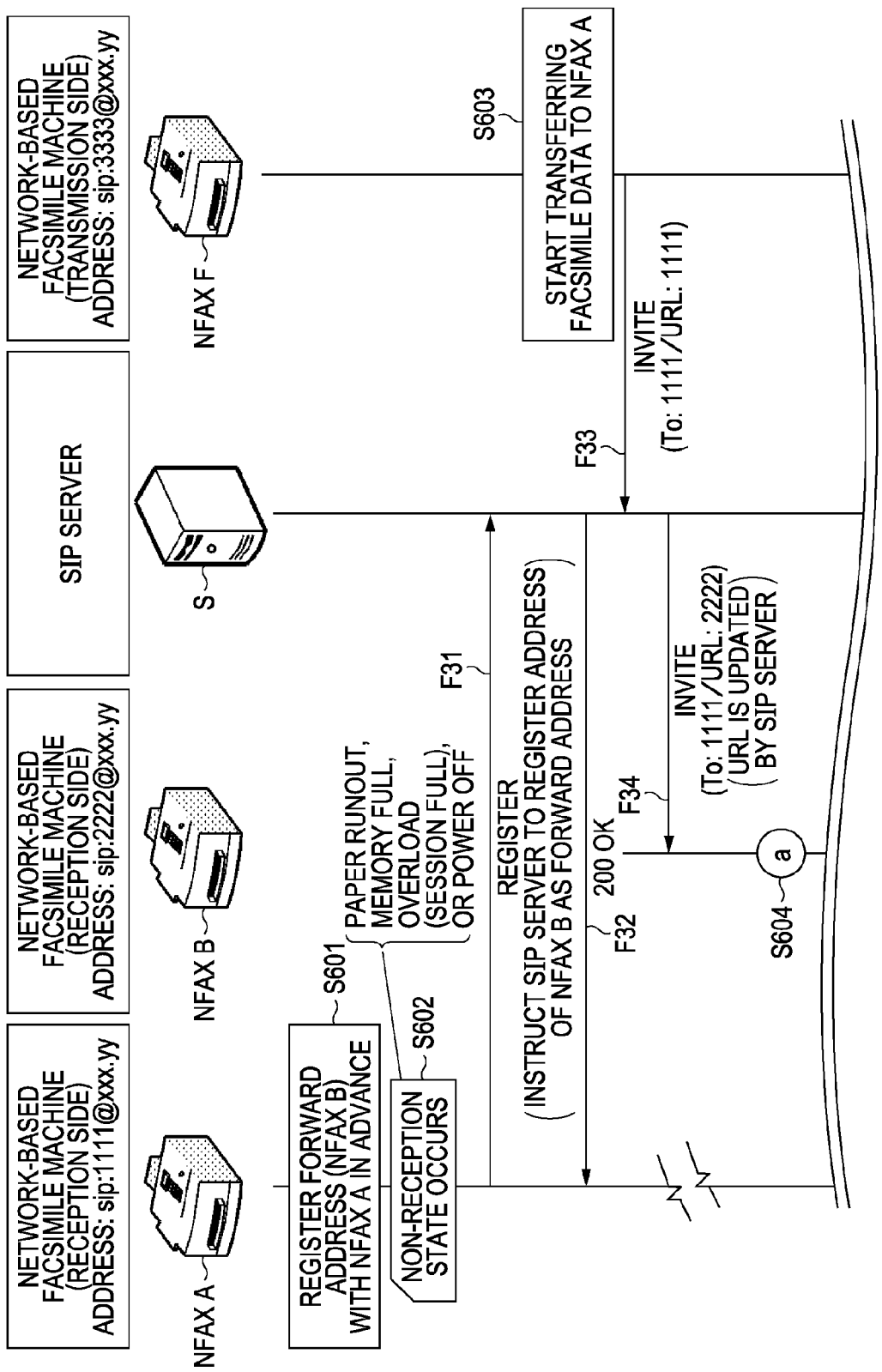

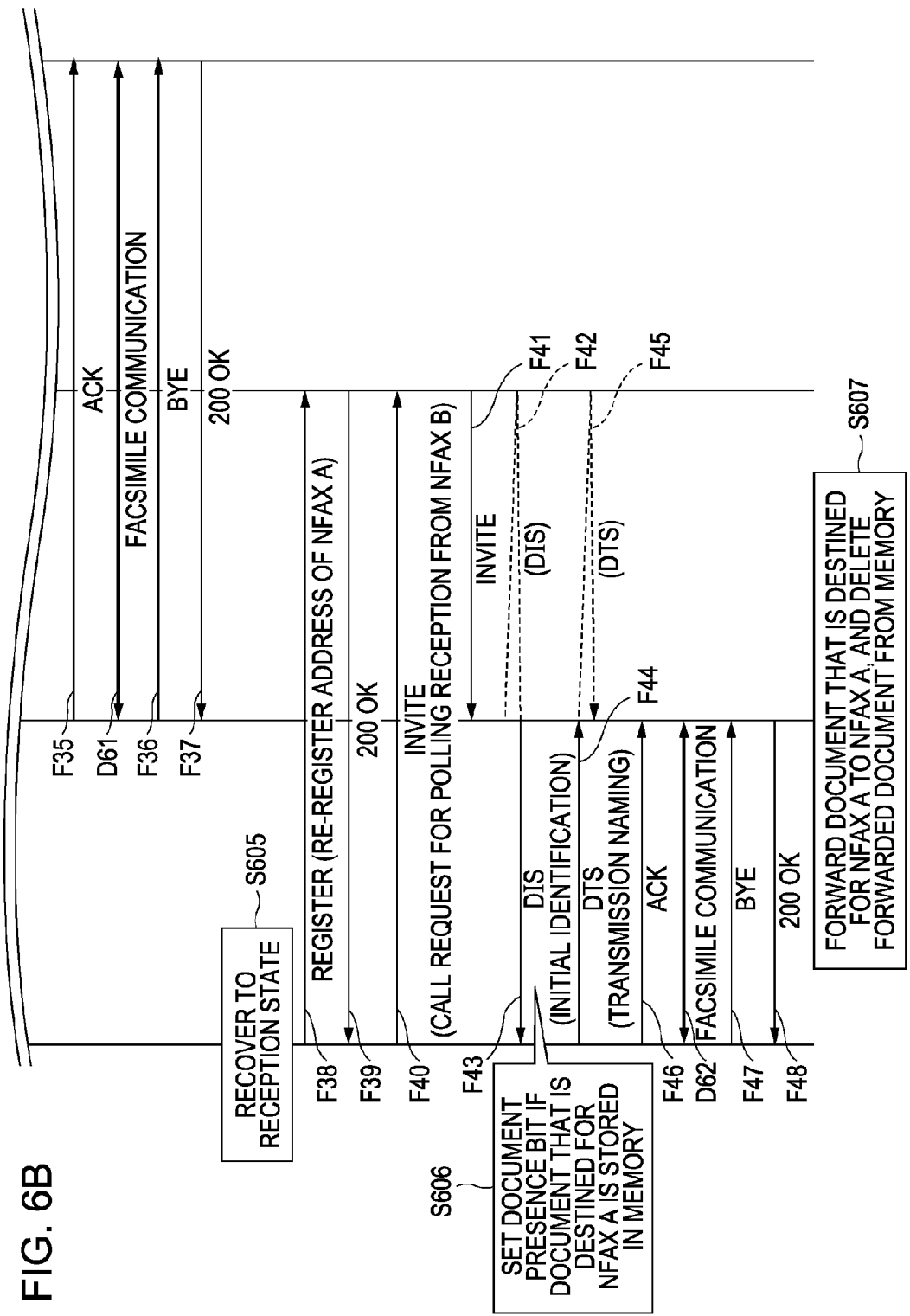

FIG. 8

\*\*\*\*\*\*\*\*\*\*\*\*\*\*\*\*\*\*\*\*\*\*\*\*\*\*\*\*\*\*\*\*\*\*\*\*\*\*\*\*
\*\*\*\*\* COMMUNICATION MANAGEMENT REPORT \*\*\*\*\*
\*\*\*\*\*\*\*\*\*\*\*\*\*\*\*\*\*\*\*\*\*\*\*\*\*\*\*\*\*\*\*\*\*\*\*\*\*\*\*\*

TO ADDRESS: sip:1111@xxx.yy

| RECEIVED TIME | URL ADDRESS | FROM ADDRESS | RECEPTION NUMBER | COMMUNICATION MODE | FILE |
|---|---|---|---|---|---|
| 04/17 20:22 | sip:2222@xxx.yy | sip:3333@zzz.yy | 3371 | RECEPTION T.38 | 04172022 |
| 04/17 20:30 | sip:2222@xxx.yy | sip:4444@aaa.yy | 3401 | RECEPTION T.38 | 04172030 |

TO ADDRESS: sip:1234@xxx.yy

| RECEIVED TIME | URL ADDRESS | FROM ADDRESS | RECEPTION NUMBER | COMMUNICATION MODE | FILE |
|---|---|---|---|---|---|
| 04/19 12:00 | sip:2222@xxx.yy | sip:3333@zzz.yy | 3377 | RECEPTION T.38 | 04191200 |

FIG. 9

FACSIMILE IMAGE

April 17, 2006  20 : 22

900

FORWARD DOCUMENT

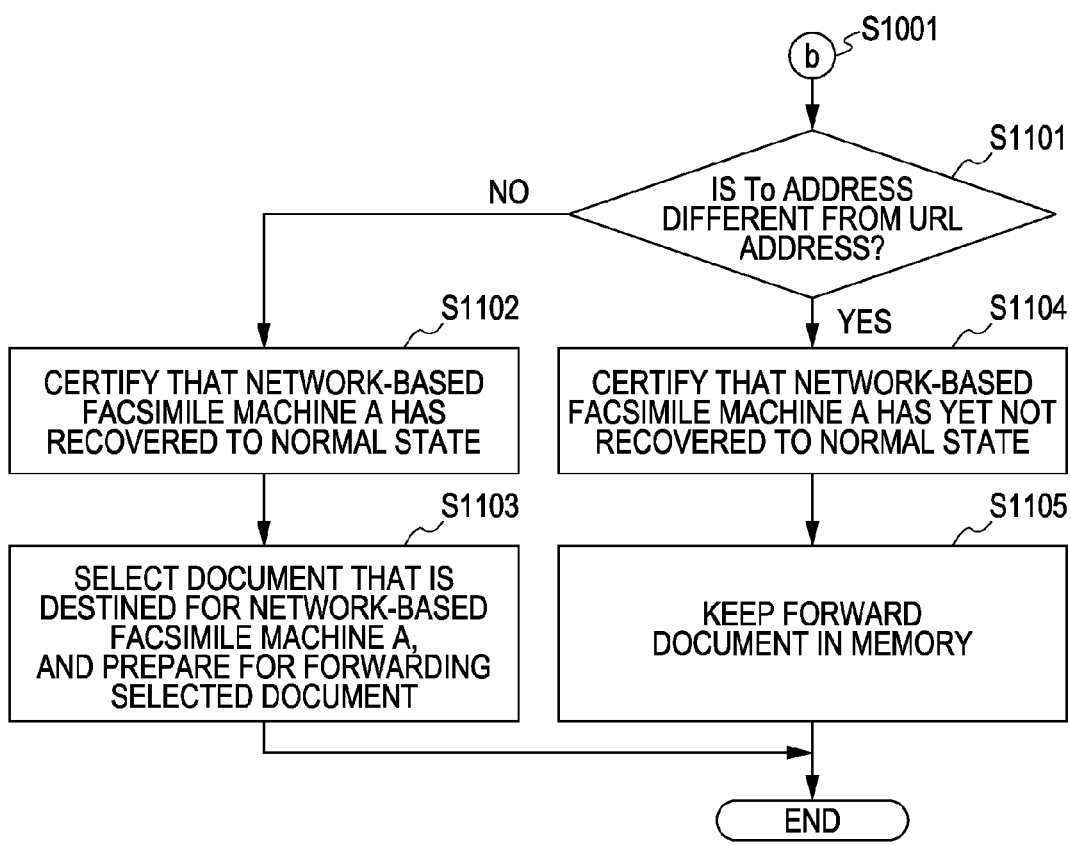

FIG. 12

STORAGE MEDIUM, SUCH AS FD OR CD-ROM

| DIRECTORY INFORMATION |
|---|
| FIRST DATA PROCESSING PROGRAM<br>PROGRAM CODE CORRESPONDING TO STEPS OF FLOW CHART SHOWN IN FIG. 7 |
| SECOND DATA PROCESSING PROGRAM<br>PROGRAM CODE CORRESPONDING TO STEPS OF FLOW CHART SHOWN IN FIG. 11 |
| |

IMAGE COMMUNICATION APPARATUS AND METHOD FOR CONTROLLING IMAGE COMMUNICATION APPARATUS

BACKGROUND OF THE INVENTION

1. Field of the Invention

The present invention relates to an image communication apparatus for receiving image data from an external device via a network and a method for controlling the image communication apparatus.

2. Description of the Related Art

To communicate information among remote offices, image data is transmitted and received using facsimile machines. The facsimile machines transmit and receive image data over a public switched telephone network (PSTN) using a protocol in conformance with ITU-T T.30.

In addition to using facsimile machines, recently, image data has been transmitted and received using an e-mail by attaching the facsimile-based image data to the e-mail in accordance with the protocol in conformance with ITU-T T.37. In this communication method, since data is transmitted and received via an Internet protocol (IP) network, image data can be transmitted and received at a cost lower than that required for the facsimile communication in accordance with the protocol in conformance with ITU-T T.30.

Furthermore, a real-time Internet facsimile communication (hereinafter referred to as "IP-FAX communication") has been developed in which facsimile data is transmitted and received in real time via an IP network using an ITU-T T.38 protocol. More specifically, a facsimile machine at a transmission side is directly connected to a facsimile machine at a reception side via an IP network so that a facsimile signal in conformance with ITU-T T.30 is converted to TCP/IP packets and is transmitted and received.

In the above-described IP-FAX communication, the call control procedure based on ITU-T H.323 is employed. Recently, session initiation protocol (SIP), which is similar to ITU-T H.323 protocol, has garnered increased attention.

When comparing the call control procedure in conformance with ITU-T H.323 with SIP, ITU-T H.323 protocol is more complicated since ITU-T H.323 includes a variety of sub-protocols. In contrast, SIP defines only basic session control sub-protocols, such as sub-protocols for starting, changing, and ending a session. Accordingly, SIP is relatively simplified. Consequently, SIP is highly flexible and can be easily integrated into other systems.

SIP includes a user agent, which is a user terminal (e.g., an IP telephone), and a SIP server. The term "SIP server" collectively refers to a proxy server, a redirect server, and a registrar server. Therefore, for example, the alternative address of a facsimile machine on a reception side can be registered using the redirect server.

More specifically, in the case where a particular facsimile machine on a reception side is specified as a destination address of image data, another facsimile machine is registered with a redirect server as a forward address of the image data. Thus, when a facsimile machine on a transmission side transmits image data to the particular address, the alternative address is read out from the redirect server. Subsequently, a call connection is started so that a connection between the facsimile machine on a transmission side and a facsimile machine at the alternative address is established. The facsimile machine on a transmission side then transmits the image data to the facsimile machine at the alternative address (refer to, for example, Japanese Patent Laid-Open No. 2005-94662).

By using the functions of SIP, if an image communication apparatus on a reception side cannot receive image data due to a print paper runout state or an overload state, such as a memory full state or a session full state, an image communication apparatus on a transmission side transmits the image data to an image communication apparatus at the alternative address.

In this way, a session is established between the image communication apparatus on a transmission side and the image communication apparatus at the alternative address, which is a forward address. Thus, facsimile communication can be performed. Accordingly, the image communication apparatus on a transmission side need not wait for starting transmission for a long time. However, in such a case, the image data is transferred to an image communication apparatus that is different from the originally intended image communication apparatus for receiving the image data, although a user on a reception side registers the forward address. That is, the user of the image communication apparatus at the original destination address has to go to the image communication apparatus at the forward address in order to pick up the transmitted image data. In addition, if the image communication apparatus that received the forwarded image data stores the image data for a long time, a memory resource may be exhausted.

SUMMARY OF THE INVENTION

Accordingly, the present invention provides an image communication apparatus and a method for controlling the image communication apparatus for forwarding image data transmitted to an image communication apparatus that is different from the originally intended image communication apparatus to the originally intended image communication apparatus.

According to an aspect of the present invention, an image communication apparatus capable of communicating with external apparatuses includes a receiving unit configured to receive image data from a first external apparatus, a storage unit configured to store the image data, a reception unit configured to receive, from a second external apparatus, a request to transmit image data that was to be transmitted from the first external apparatus to the second external apparatus, an identifying unit configured to identify the image data that was to be transmitted from the first external apparatus to the second external apparatus among the image data stored in said storage unit, and a transmission unit configured to transmit the image data identified by the identifying unit to the second image communication apparatus in response to the request.

According to another aspect of the present invention, an image communication apparatus capable of communicating with external apparatuses includes a receiving unit configured to receive image data from a first external apparatus, a storage unit configured to store the image data, an identifying unit configured to identify image data that was to be transmitted from the first external apparatus to a second external apparatus among the image data stored in the storage unit, a determination unit configured to determine whether the second external apparatus is in a state in which the second external apparatus is able to receive image data, a transmission unit configured to transmit the image data identified by said identifying unit to the second external apparatus in a case where the determination unit determines that the second external apparatus is in a state in which the second external apparatus is able to receive image data.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate numerous embodiments of the invention, and, together with the description, serve to explain the principles of the invention.

FIG. 6A illustrates a third data communication session in the network system shown in FIG. 2.

FIG. 6B is a continuation of the diagram illustrated in FIG. 6A.

FIG. 8 illustrates an example printout of a communication management report of the image communication apparatus according to the first exemplary embodiment.

FIG. 9 illustrates an example printout of a communication management report of the image communication apparatus according to the first exemplary embodiment.

FIG. 11 is a flow chart illustrating a second data processing procedure performed by the image communication apparatus according to the second exemplary embodiment.

FIG. 12 illustrates a memory map of a storage medium for storing a variety of programs that are readable by the image communication apparatus according to the present invention.

DESCRIPTION OF THE EMBODIMENTS

Figure 1:
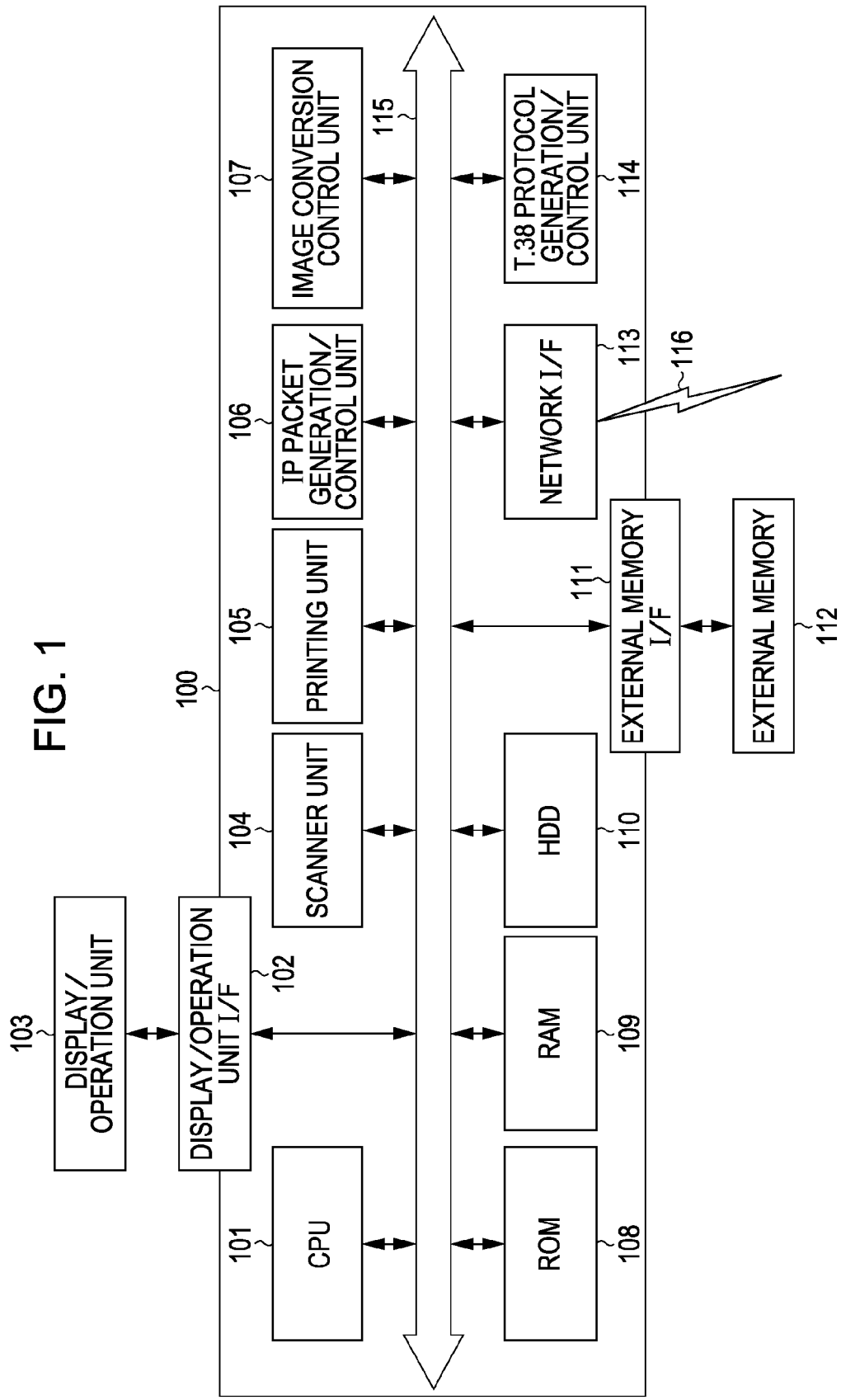
FIG. 1 is a block diagram illustrating the configuration of an image communication apparatus according to a first exemplary embodiment of the present invention.

Exemplary embodiments of the present invention are described below with reference to the accompanying drawings.
System Architecture FIG. 1 is a block diagram illustrating the configuration of an image communication apparatus according to a first exemplary embodiment of the present invention. While the following description is made with reference to a network-based facsimile machine 100 as an example image communication apparatus, any image communication apparatus that communicates image data via a network can be employed. Hereinafter, the network-based facsimile machine is simply referred to as an "NFAX".

As illustrated in FIG. 1, a central processing unit (CPU) 101 controls devices connected to the CPU 101 in accordance with control programs stored in a read only memory (ROM) 108.

A display/operation unit 103 displays user interface information, such as a window, an icon, a message, and a menu, on a display screen thereof via a display/operation unit interface (I/F) 102. The display/operation unit 103 includes a variety of keys for inputting information and a pointing device used for selecting the icon, the menu, and other objects displayed on the display screen.

A scanner unit 104 scans a document. A printing unit 105 prints print data stored in a random access memory (RAM) 109 or a hard disk drive (HDD) 110. The ROM 108 stores a variety of data in addition to the control programs. One of the control programs is used for executing the procedure represented by a flow chart illustrated in FIG. 11 and a session illustrated in FIGS. 6A, 6B, and 10.

The RAM 109 is used for a work area of the CPU 101, a data save area used when error processing is performed, and a control program load area. The HDD 110 serves as an internal storage unit. The HDD 110 stores a variety of control programs and print data. To read and write data from and to an external memory 112, an external memory interface (I/F) 111 is used.

The external memory 112 may be a removable recording medium, such as a universal serial bus (USB) memory. A network I/F 113 enables the image communication apparatus to communicate with a SIP server illustrated in FIG. 2, other information processing apparatuses, and a printer via IP network 116. A CPU bus 115 includes an address bus, a data bus, and a control bus. In the present embodiment, the control program is supplied from the ROM 108 to the CPU 101.

A T.38 protocol generation/control unit 114 generates facsimile transmission information in conformable with ITU-U T.38 protocol and retrieves facsimile transmission information from received ITU-U T.38 protocol data.

An IP packet generation/control unit 106 maps data in conformable with ITU-U T.38 to an IP packet and retrieves data in conformance with ITU-U T.38 from a received IP packet. An image conversion control unit 107 compresses or decompresses an image transmitted or received in a facsimile format. The image conversion control unit 107 further changes the size and the line density of the image.

Figure 2:
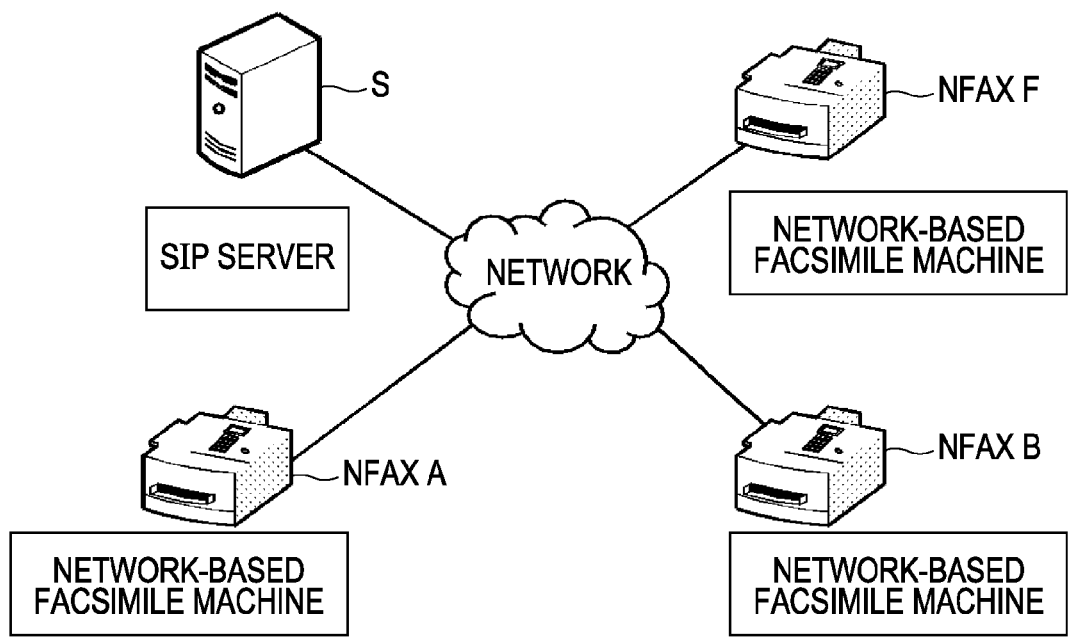
FIG. 2 illustrates an example network system including the image communication apparatus shown in FIG. 1.

FIG. 2 illustrates an example network system including the image communication apparatus illustrated in FIG. 1. For example, the network system includes three NFAXes and a SIP server.

In FIG. 2, an NFAX A, an NFAX B, and an NFAX F are SIP-based facsimile machines. A SIP server S includes four server functions: a proxy server, a registrar server, a location server, and a redirect server. These four server functions are used when executing communication with NFAXes using SIP. The four server functions may be implemented in one server. Alternatively, the four server functions may be implemented in four different servers.

When the NFAX F calls the NFAX A, which is a destination of a facsimile communication, the destination address is specified as follows. In the present embodiment, the destination address is represented using an address expression "sip:ipfax-a@domain.com". This address expression is referred to as a "SIP-URI (uniform resource identifier)".

The "sip:" part is an identifier that indicates the protocol of SIP. The "ipfax-a" part immediately before the letter "@" indicates the ID of a user at the destination of the communication (a SIP user name). The "domain.com" part immediately after the letter "@" indicates the SIP domain.

Figure 3:
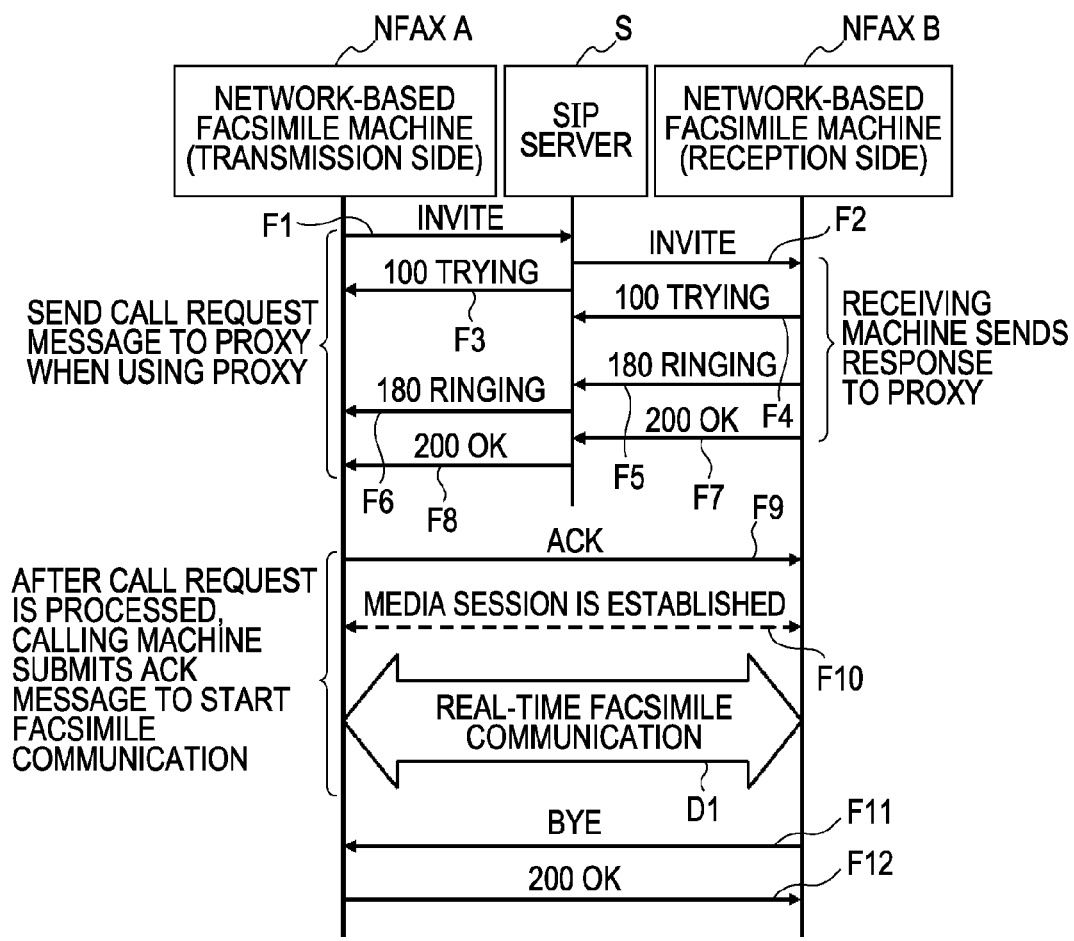
FIG. 3 illustrates a first data communication session in the network system shown in FIG. 2.

FIG. 3 illustrates a first data communication session established in the network system illustrated in FIG. 2. A basic communication session flow of SIP performed when the NFAX A on a transmission side calls the NFAX B on a reception side is illustrated in FIG. 3. In FIG. 3, the sessions are represented by "F1" to "F12". The data communication step is represented by "D1". The time-series sessions are depicted from the top down. Similar numbering will be used in describing FIG. 3 as was utilized above in describing FIG. 2.

As illustrated in FIG. 3, a SIP session is established and terminated using a method and a response code.

The NFAX A on the transmission side submits a method INVITE to a proxy server located in a domain A of the NFAX A in order to establish a session (F1). The proxy server is one of the functions provided by the SIP server S.

Upon receipt of the method INVITE, the proxy server returns a response code 100 "Trying" to the NFAX A (F3). The response code 100 "Trying" indicates that the proxy server is forwarding the request to the NFAX B. Concurrently, the proxy server actually forwards the method INVITE to the NFAX B on the reception side (F2).

At that time, like the proxy server, the NFAX B on the reception side returns a response code 100 "Trying" to the proxy server (F4).

In this way, the method INVITE reaches the NFAX B via the proxy server. Upon receipt of the method INVITE, the NFAX B sends a response code 180 "Ringing" to the NFAX A (F5 and F6).

If the NFAX B accepts the call, the NFAX B then sends a response code 200 "OK" to the NFAX A (F7 and F8).

Subsequently, the NFAX A sends a message (a method ACK) indicating that it has received the response to the method INVITE (F9).

Thus, the session is established (F10). After the session is established, a real-time facsimile communication is performed using ITU-T T.38 protocol (D1).

After the facsimile communication is completed, the NFAX B submits a method "BYE" to the NFAX A (F11). The NFAX A returns a response code 200 "OK" corresponding to the method "BYE" to the NFAX B (F12). At that time, the session is terminated.

Figure 4:
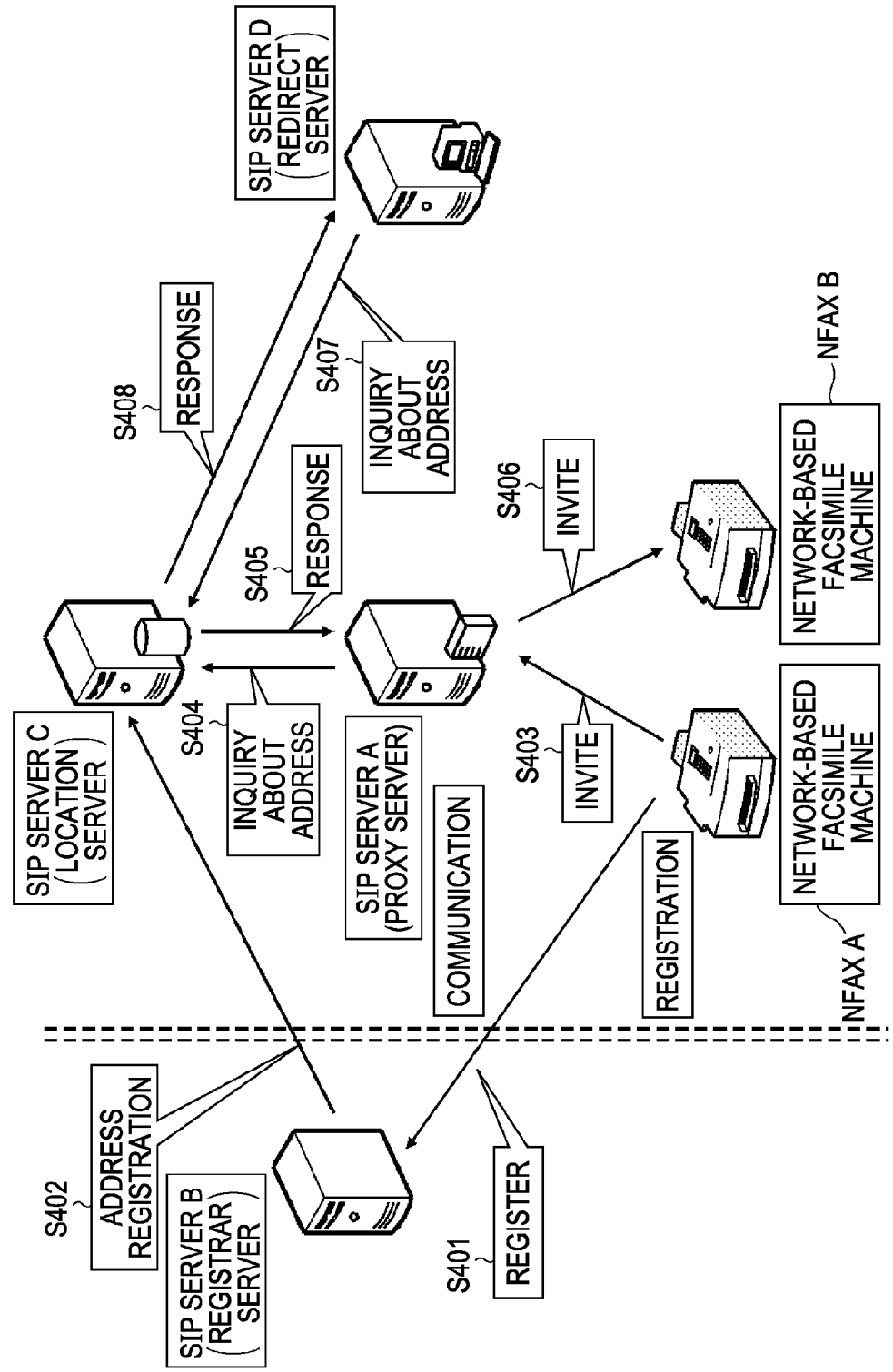
FIG. 4 schematically illustrates a relationship between each of the server functions of a SIP server shown in FIG. 2 and each of the NFAXes on the transmission side.

FIG. 4 is a schematic illustration of a relationship between each of the server functions of the SIP server S and each of the NFAXes on the transmission and reception sides. For ease of description, the server functions of the SIP server S are provided by different apparatuses. In addition, each of the server apparatuses is connected to the NFAXes via a network using T.38 protocol. In FIG. 4, communication steps are represented by S401 to S408.

A process flow in which the NFAX A on the transmission side registers the location thereof is described first.

The registrar server (a SIP server B) receives a request for registering the address information about each of the NFAXes from the NFAX. The location server (a SIP server C) stores and manages the address information about each of the NFAXes received from the registrar server (the SIP server B).

Each of the server apparatuses includes hardware resources that a normal computer apparatus has. Each of the server apparatuses is configured to be capable of communicating with other apparatuses using T.38 protocol. Examples of the hardware resources include a control unit and a storage unit, such as a hard disk. The control unit incorporates a CPU, a ROM, and a RAM.

In addition, the location server (the SIP server C) responds to a request for referencing the address information received from the redirect server (a SIP server D) and the proxy server (a SIP server A) based on the stored address information therein.

The NFAX A sends the location information (address information) thereof to the registrar server (the SIP server B) using a method "REGISTER" in advance (S401). Thereafter, the registrar server (the SIP server B) registers the sent location information in a storage unit of the location server (the SIP server C) (S402).

A process of calling the NFAX B on the reception side performed by the NFAX A on the transmission side is described next. The method "INVITE" is transmitted from the NFAX A to the proxy server (the SIP server A) first (S403).

Upon receipt of the method "INVITE", the proxy server (the SIP server A) inquires about the location information about the NFAX A corresponding to the specified address to the location server (the SIP server C) (S404). Thus, the NFAX B can be identified (S405).

Subsequently, the proxy server (the SIP server A) transfers the method "INVITE" to the NFAX B (S406). Thereafter, image data is transferred in accordance with the procedure illustrated in FIG. 3.

The role of the redirect server is described next. The alternative address of each of the NFAXes can be registered with the redirect sever. That is, any NFAX can register the address of another NFAX as the alternative address, which is used when the NFAX cannot receive data. In this way, when the NFAX is called, the alternative address of the NFAX can be read out by accessing the location server and the redirect server. Subsequently, a method "INVITE" sent from an NFAX on the transmission side is forwarded to the NFAX at the alternative address. The redirect server (the SIP server D) also inquires about the location information corresponding to the specified address to the location server (the SIP server C) (S407) and receives the response from the location server (the SIP server C) (S408).

Figure 5:
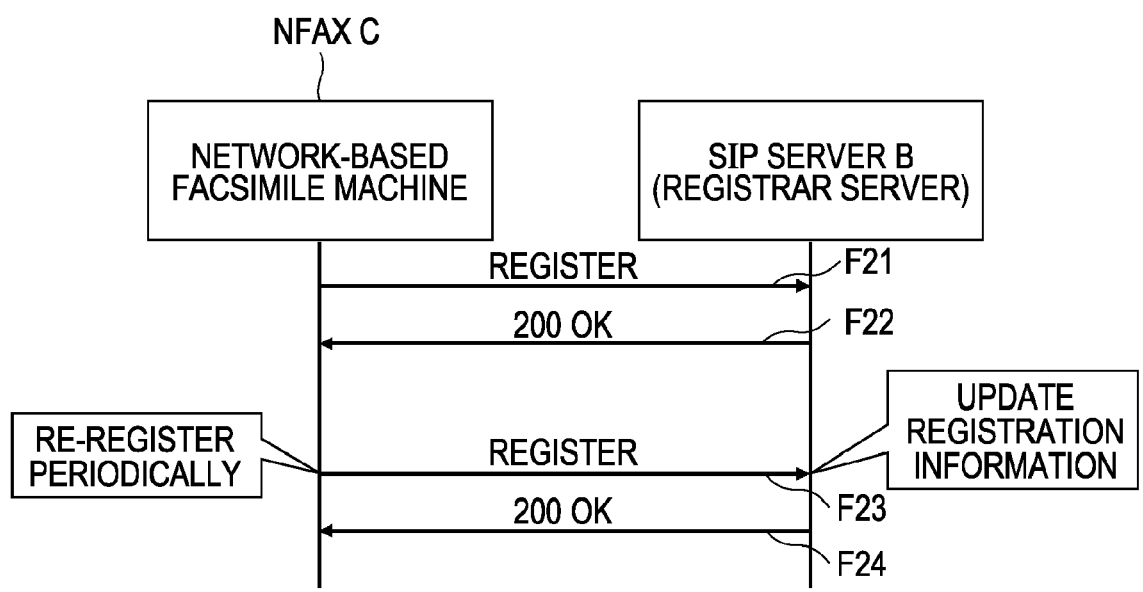
FIG. 5 illustrates a second data communication session in the network system shown in FIG. 2.

FIG. 5 illustrates a second data communication session in the network system shown in FIG. 2. In FIG. 5, a session flow is illustrated when an NFAX C registers the device information via the registrar server shown in FIG. 4.

As illustrated in FIG. 5, the NFAX C sends a REGISTER request to the SIP server B (the registrar server) (F21). The REGISTER request includes the SIP-URI (a "To" header), the device address (a "CONTACT" header), and an expiration date (an "Expires" header). The NFAX C inputs the IP address of the SIP terminal into the REGISTER request and, subsequently, transmits the REGISTER request. Thus, the IP address is registered with the location server. After the NFAX C receives a response 200 "OK" from the SIP server B (F22), the registration is completed.

The registration has an expiration date. When the expiration date has passed, the registration is canceled. Before the registration is canceled, a REGISTER request is re-transmitted to the SIP server B (F23). In this way, the registration information is periodically updated. After the NFAX C receives a response 200 "OK" from the SIP server B (F24), the registration update is completed.

In this manner, the latest address can be registered with the location server, and therefore, the image communication apparatus can receive the latest address at all times. In addition, when the image communication apparatus goes off-line, the registration can be canceled.

Forwarding Process Using Alternative Address

FIGS. 6A and 6B illustrate a third data communication session in the network system illustrated in FIG. 2. An example of a data communication session flow performed in the network system illustrated in FIG. 2 is illustrated in FIGS. 6A and 6B. The sessions are represented by "F31" to "F48". The data communication steps are represented by "D61" and "D62". URI information "1111", "2222", and "3333" are registered with the location server for the NFAX A, the NFAX B, and, the NFAX F, respectively.

The NFAX A, the NFAX B, and, the NFAX F are connected to the SIP server S via a network. In this configuration, a user instructs transmission of image data from the NFAX F to the NFAX A via the SIP server S. However, at that time, the NFAX A may be incapable of reception for some reason. The alternative address of the NFAX A is the address of the NFAX B, which is registered with a redirect server in advance. Note that examples of a non-reception state of the NFAX A include a state in which print paper sheets have run out, a state in which the memory is full, and a state in which the power has been turned off.

The NFAX A stores the forward address that is input from the user in advance (S601). When the NFAX A becomes incapable of reception (S602), the NFAX A sends the forward address to the SIP server S using a REGISTER request (F31). The SIP server S registers the received address therewith as an alternative address (the address of the NFAX B in the present embodiment).

After the forward address is registered, the NFAX A receives a response 200 "OK" from the SIP server S (F32). In such a situation, the NFAX F calls the NFAX A for facsimile transmission (S603).

The SIP server S receives a method "INVITE" from the NFAX A (F33). This method "INVITE" includes "1111" corresponding to the information "To" and "1111" corresponding to the information "URI". The information "To" and "URI" are defined by SIP. The information "To" indicates the NFAX A that is specified as a destination NFAX by the user. The information "URI" indicates an NFAX to which a control signal, such as a method "INVITE", is actually sent. In F33, a value "1111", which corresponds to the NFAX A, is specified for each of the information "To" and information "URI".

Since "1111" is specified for the destination NFAX, the SIP server S attempts to receive information about the NFAX A. However, as described above, the NFAX A is in a non-reception state. In addition, the address of the NFAX B is registered with the SIP server S as the alternative address of the NFAX A.

Accordingly, the SIP server S forwards the method "INVITE" to the forward address NFAX B (F34). At that time, the method "INVITE" includes a value "1111" in the "To" field and a value "2222" in the "URI" field. That is, the SIP server S updates the URI address in the SIP information to "2222" corresponding to the NFAX B by using the information registered with the redirect server.

At step S604, the NFAX B sends an ACK message to the NFAX F on behalf of the NFAX A (F35), and therefore, the session between the NFAX F and the NFAX B is established normally. Subsequently, a facsimile communication is performed between the NFAX F and the NFAX B (D61).

Thereafter, the NFAX B submits a method "BYE" to the NFAX F (F36). In response to the method "BYE", the NFAX F returns a response code 200 "OK" to the NFAX B (F37). Thus, the session is terminated.

On the other hand, after the NFAX A detects that it is in a non-reception state, the NFAX A executes a process in accordance with the reason for the non-reception state so that the NFAX A returns to a reception state again (S605).

Subsequently, the NFAX A instructs the SIP server S to register the information about the NFAX A using a REGISTER request again (F38). After the SIP server S registers the information about the NFAX A therewith, the NFAX A receives a response 200 "OK" from the SIP server S (F39).

The NFAX A sends a method INVITE to the NFAX B via the SIP server S (F40 and F41). The method INVITE serves as a call for polling reception. Thereafter, the NFAX A receives a DIS (initial identification) from the NFAX B (F42 and F43).

At that time, the CPU 101 of the NFAX B determines whether a document that was sent to the NFAX A is stored in a storage unit of the NFAX B. If a document that was sent to the NFAX A is stored in the storage unit of the NFAX B, a bit indicating that a document is present is set in the DIS so as to notify the NFAX A of that information (S606). However, any other notification method may be employed.

In contrast, if any document that was sent to the NFAX A is not stored in the storage unit of the NFAX B, the processing is completed without performing a facsimile communication. However, if a document that was sent to the NFAX A is stored in the storage unit of the NFAX B, the NFAX B receives a DTS (a transmission instruction) from the NFAX A (F44 and F45).

In this way, upon receipt of a polling request via the server from an image communication apparatus that has recovered from an error state, the CPU 101 of the NFAX B determines whether data that was sent to the image communication apparatus that has recovered from the error state is stored in the NFAX B. If data that was sent to the image communication apparatus that has recovered from the error state is stored in the NFAX B, the CPU 101 of the NFAX B transfers the data stored in the storage unit to the image communication apparatus that has recovered from the error state. More specifically, after the above-described notification process is completed, the following data transfer process is performed.

That is, the NFAX A sends an ACK message to the NFAX B (F46) so as to establish a reception session and perform a facsimile communication (D62).

Thereafter, the NFAX A submits a method "BYE" to the NFAX B (F47). The NFAX B returns 200 "OK" to the NFAX A in response to the method "BYE" (F48). Thus, the session is terminated.

In this way, the NFAX B transmits a document stored in the storage unit thereof to the NFAX A. After the transmission is completed, the NFAX B deletes the document stored in the storage unit (S607).

Figure 7:
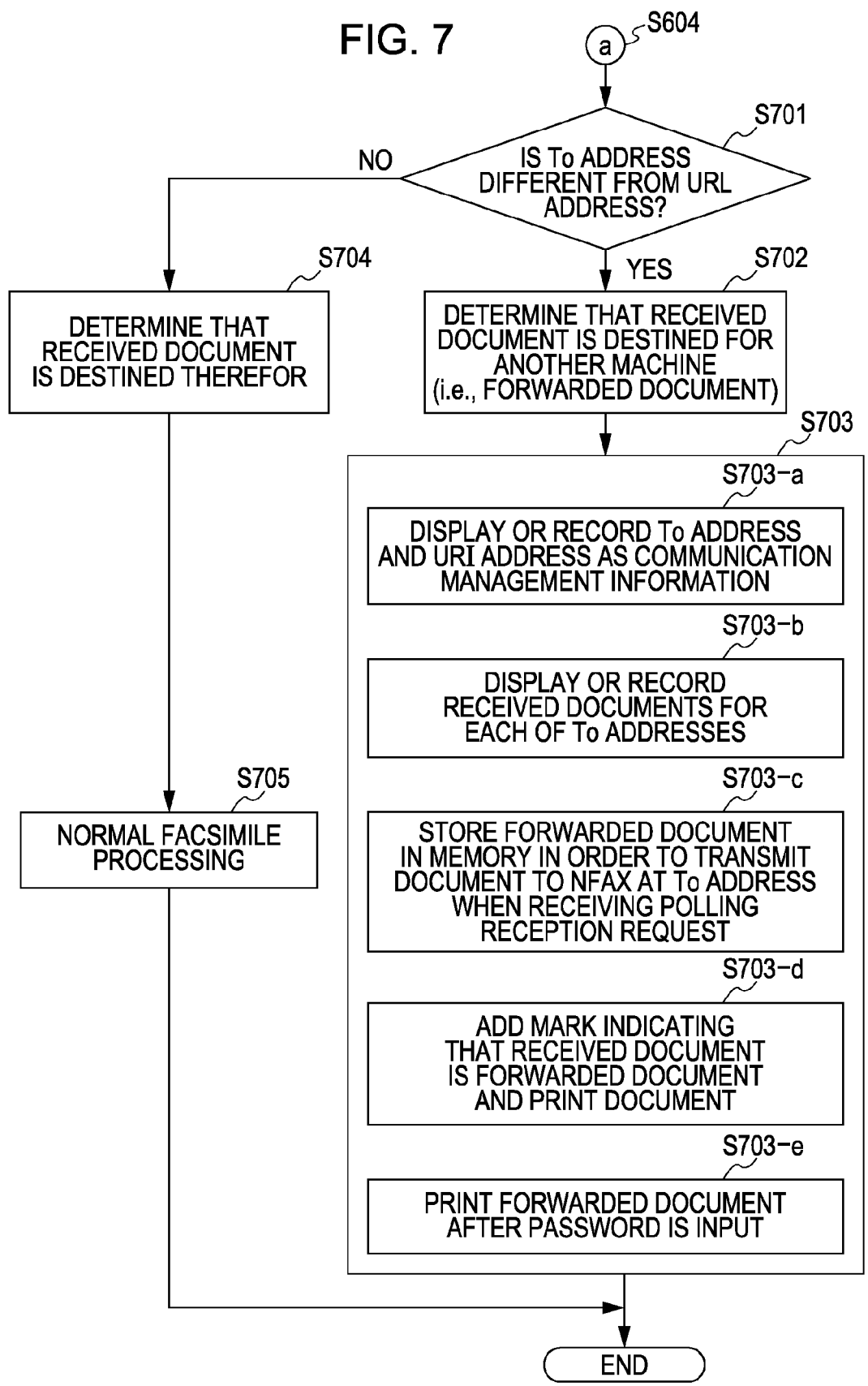
FIG. 7 is a flow chart illustrating a first data processing procedure performed by the image communication apparatus according to the first exemplary embodiment.

FIG. 7 is a flow chart illustrating a first data processing procedure performed by the image communication apparatus according to the present embodiment. In FIG. 7, a process is described in detail in which the NFAX B illustrated in FIG. 2 is specified by the NFAX A as an NFAX at a forward address and receives a forwarded document (see S604). The CPU 101 of the NFAX B loads the control program stored in the HDD 110 into the RAM 109 so that the process of each step is performed.

As illustrated in FIG. 6A, in the session between the NFAX B and the SIP server S, the NFAX B, at step S604, receives the SIP information from the SIP server S. The CPU 101 retrieves the "To" address and the "URI" address from the SIP information. Subsequently, the CPU 101 determines whether the "To" address is different from the "URI" address by comparing the two addresses (S701). If the "To" address is different from the "URI" address, the CPU 101 determines that the image data was originally sent to another image communication apparatus (S702). Thereafter, some of or all of the subprocesses in step S703 may be performed based on the SIP information.

At step S703, communication management information based on the "To" address and the "URI" address is recorded or displayed on a display unit (S703-a). Thus, the user of the NFAX B can determine whether the image data was originally destined for the NFAX B or another NFAX. Alternatively, the CPU 101 records or displays the number of received documents for each of the "To" addresses (S703-b).

In addition, in order to respond to a polling request from the NFAX at the original address, the CPU 101 stores the received image data in the HDD 110 for each of the "To" addresses (S703-c). Furthermore, the CPU 101 adds image information (a mark) indicating that the image data is to be transmitted to another NFAX to the received image data. Subsequently, the CPU 101 prints the image data (S703-d). Still furthermore, before the CPU 101 starts printing the image data having the destination address of another NFAX, the CPU 101 requests the user to input a predetermined password (S703-e).

However, if, at S701, the CPU 101 determines that the "To" address is the same as the "URI" address, the CPU 101 determines that the document is to be forwarded thereto (S704). Accordingly, the CPU 101 performs a normal facsimile reception process such as printing the received data on a sheet or storing the received data into the HDD 110 (S705). Thereafter, the processing is completed.

In the case where the document is printed by the image communication apparatus at the forward address, the image communication apparatus may delete the image data of the document from the storage unit.

FIGS. 8 and 9 illustrate exemplary printouts of a communication management report of the image communication apparatus according to the present embodiment. In this example, a printout of the communication management report that is output at step S703-e in FIG. 7 is illustrated.

In the exemplary printout, a reception time, the URI address, and a "From" address are printed for each of the "To" addresses.

FIG. 9 illustrates an exemplary facsimile image having a mark 900 (the text "Forward Document" in the present embodiment) indicating that the received document is forwarded, as described in step S703-d of FIG. 7, in the footer section of the printed image.

According to the present embodiment, when the image communication apparatus at the original destination address recovers from an error state, the image communication apparatus sends a polling request to the image communication apparatus at the forward address. In this way, after recovering from an error state, the image communication apparatus can acquire the data that was forwarded to another image communication apparatus, which is specified as an image communication apparatus at the forward address.

In the above-described embodiment, the NFAX A submits a method "INVITE" as a call request for performing polling reception of image data. Thus, as described above, after recovering from an error state, the image communication apparatus at an original destination address sends a polling request to the image communication apparatus at the forward address so as to acquire the image data. However, the image communication apparatus at the forward address may periodically attempt to transmit the image data to the image communication apparatus at the original destination address. Such an embodiment is described in detail next.

Figure 10A:
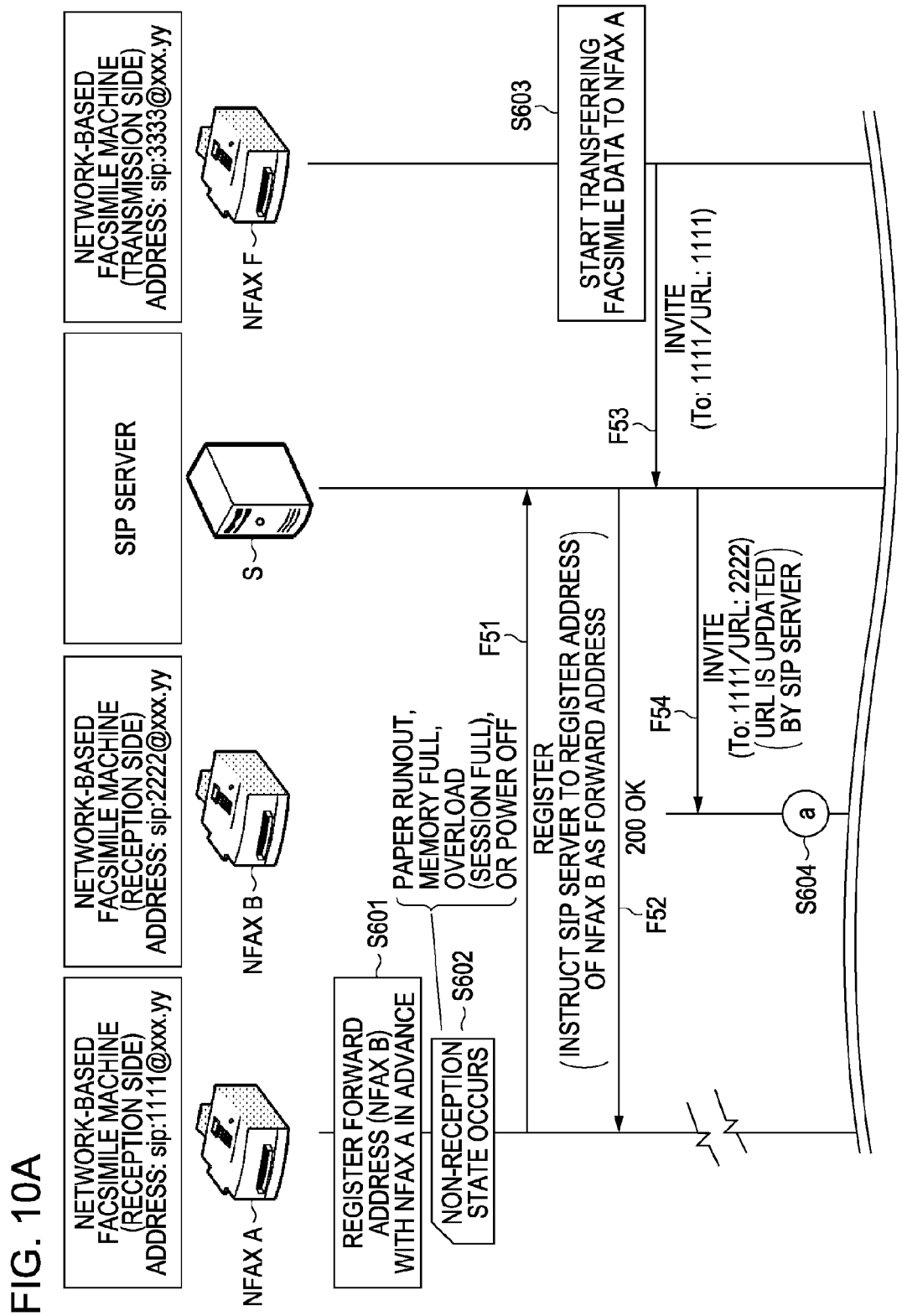
FIG. 10A illustrates a fourth data communication session in the network system shown in FIG. 2.
Figure 10B:
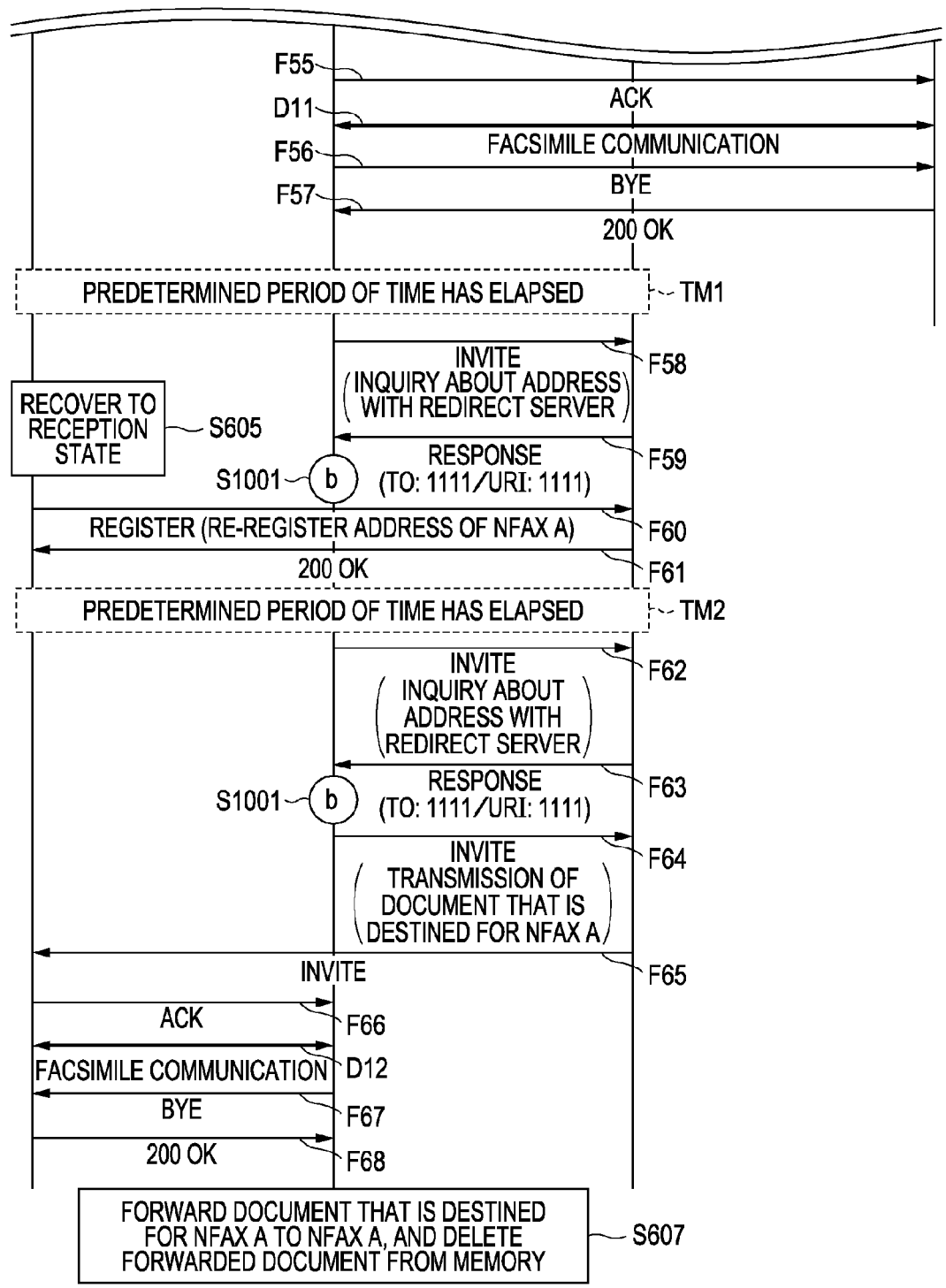
FIG. 10B is a continuation of the diagram illustrated in FIG. 10A.

FIGS. 10A and 10B illustrate a fourth data communication session in the network system illustrated in FIG. 2 according to a second exemplary embodiment of the present invention. An example of a data communication session flow performed in the network system illustrated in FIG. 2 is illustrated in FIGS. 10A and 10B. The sessions are represented by "F51" to "F68". The data communication steps are represented by "D11" and "D12".

As illustrated in FIGS. 10A and 10B, in this network system, the NFAX A, the NFAX B, and the NFAX F are connected to the SIP server S. Using this network system, a user instructs the NFAX F to send image data to the NFAX A via the SIP server S. However, at that time, the NFAX A is unreceivable for some reason. The alternative address of the NFAX A is the address of the NFAX B, which is registered with a redirect server in advance. Note that examples of a non-reception state of the NFAX A include a state in which print paper sheets have run out, a state in which the memory is full, and a state in which the power has been turned off.

The NFAX A stores the address of the NFAX B as the forward address that is input from the user in advance (S601).

If the NFAX A becomes unreceivable (S602) due to the following conditions, the NFAX A sends that address to the SIP server S as a forward address using a REGISTER request (F51). In the present embodiment, the alternative address is the address of the NFAX B. The SIP server S registers the received address therewith as the forward address.

Examples of the conditions under which the NFAX A becomes unreceivable include a state in which print paper sheets have run out, a state in which the memory is full, an overload state in which the number of sessions has reached the maximum value, and a state in which the power has been turned off.

After the forward address is registered, the NFAX A receives a response 200 "OK" from the SIP server S (F52). In such a situation, the NFAX F calls the NFAX A for facsimile transmission (S603).

The SIP server S receives a method "INVITE" from the NFAX F (F53). As in the first embodiment, this method "INVITE" includes "1111" in the "To" address field and "1111" in the "URI" address field. The value "1111" corresponds to the NFAX A.

Upon receipt of the method "INVITE", the SIP server S attempts to receive information about the NFAX A from the location server. However, as described above, the NFAX A is in a non-reception state. In addition, an address "2222" of the NFAX B is registered with the SIP server S as the alternative address of the NFAX A.

Accordingly, the SIP server S forwards the method "INVITE" to the NFAX B at the forward address (F54). At that time, the method "INVITE" includes a value "1111" in the "To" field and a value "2222" in the "URI" field, which indicates the forward address. That is, the SIP server S updates the URI address in the SIP information to "2222" corresponding to the NFAX B by using the information registered with the redirect server.

Subsequently, the NFAX B sends an ACK message to the NFAX F (F55), and therefore, the session between the NFAX F and the NFAX B is established normally. Thereafter, a facsimile communication is performed between the NFAX F and the NFAX B (D11). Finally, the NFAX B submits a method "BYE" to the NFAX F (F56). In response to the method "BYE", the NFAX F returns a response code 200 "OK" to the NFAX B (F57). Thus, the session is terminated.

After a predetermined period of time has elapsed (at predetermined intervals) (TM1), the NFAX B inquires about the address of the NFAX A to the redirect server (F58). By receiving a response from the SIP server S (F59), the NFAX B can determine the address of the NFAX A using the SIP information in the response.

In addition, the NFAX B can detect that the NFAX A has returned to a communicable state using the response information. When the NFAX A returns to a communicable state (S605), the NFAX A instructs the SIP server S to register the address of the NFAX A again using a REGISTER request (F60).

After the re-registration of the NFAX A is completed, the NFAX A receives a response 200 "OK" from the SIP server S (F61).

After a predetermined period of time has elapsed (at predetermined intervals) (TM2), the CPU 101 of the NFAX B inquires about the address of the NFAX A to the redirect server of the SIP server S (F62). The CPU 101 then receives a response (To: 1111/URI: 1111) from the SIP server S (F63). The CPU 101 of the NFAX B determines whether the forward address of the data stored in the storage unit is changed using the forward address information registered with the SIP server S. That is, the CPU 101 of the NFAX B determines whether the "To" field is changed from "2222" to "1111" for the stored information having "1111" in the URI field. If the CPU 101 of the NFAX B determines that the forward address of the data is changed, the following processing is performed in order to forward the data that is stored in the storage unit and that is destined for another image communication apparatus.

The NFAX B sends a connection request to the SIP server S in order to transmit the document that is destined for the NFAX A (see D11) first (F64). Subsequently, the NFAX A receives a method INVITE from the NFAX B via the SIP server S (F65).

The NFAX A sends an ACK message to the NFAX B (F66). Thus, a session is established, and a facsimile communication is performed (D12). The NFAX B reads out the document that is destined for the NFAX A from the storage unit and transfers the document. Finally, the NFAX B sends a method "BYE" (F67). In response to the method "BYE", a response "OK" is returned from the NFAX A to the NFAX B (F68). Thus, the session is terminated.

After the data transmission is completed, the NFAX B deletes the document that is destined for the NFAX A from the storage unit thereof (S607).

The forward instruction is canceled after the NFAX A returns to a reception state again (S605), the NFAX A instructs the SIP server S to re-register the address of the NFAX A using a REGISTER request, and the NFAX A receives a response 200 "OK" indicating that the forward address is updated.

Turning to FIG. 11, a process (S1001) is performed after the above-described predetermined period of time has elapsed (at predetermined intervals) (TM2) and the NFAX B inquires about the address of the NFAX A to the redirect server.

FIG. 11 is a flow chart illustrating a second data processing procedure performed by the image communication apparatus according to the present embodiment. In FIG. 11, a process is described in detail in which the NFAX B illustrated in FIG. 2 receives a forwarded document. The CPU 101 of the NFAX B loads the control program stored in the ROM 108 and the HDD 110 into the RAM 109 so that the process of each step in FIG. 11 is performed.

At step S1101, the CPU 101 of the NFAX B receives the SIP information from the redirect server. The CPU 101 retrieves the "To" address and the "URI" address from the SIP information. Subsequently, the CPU 101 determines whether the "To" address is different from the "URI" address by comparing the two addresses. If the "To" address is different from the "URI" address, the CPU 101 determines at step S1104 that the NFAX A has not yet returned to a reception state.

At step S1105, the document to be transferred remains stored in the storage unit, and the CPU 101 waits for the next inquiry to be made to the redirect server. As used herein, the term "storage unit" refers to the HDD 110 and the RAM 109.

However, if, at step S1101, the "To" address is equal to the "URI" address, the CPU 101 determines at step S1102 that the NFAX A has returned to a reception state. Subsequently, the CPU 101 selects documents that are destined for the NFAX A from among the documents stored in the storage unit and, at step S1103, prepares for transfer of the selected documents. Thereafter, the processing is completed.

In this way, even when the NFAX A cannot receive image data for some reason, the image data can be forwarded to an image communication apparatus that is specified as an alternative image communication apparatus (e.g., the NFAX B) through a facsimile communication.

In addition, the NFAX F can transmit image data at any time. Furthermore, when the NFAX A returns to a reception state, the NFAX B, which is specified as an alternative image communication apparatus, can transfer a document to any image communication apparatus that the user who transmits the document desires.

Still furthermore, an NFAX can easily determine whether the received document is a document that was originally destined therefor or a document forwarded from another image communication apparatus.

An exemplary structure of a data processing program that is readable by the image communication apparatus according to another embodiment of the present invention is described below with reference to a memory map illustrated in FIG. 12.

Although not illustrated, information for managing the programs stored in the storage medium (e.g., the version information and the author) may be further stored in the storage medium. Still furthermore, information associated with the operating system (OS) that reads the programs (e.g., icons for identifying the programs) may be stored in the storage medium.

In addition, data used by a variety of programs are managed using a directory of the storage medium. Furthermore, a program for installing a variety of programs in a computer may be stored in the storage medium. Still furthermore, if the installation program is compressed, a program for decompressing the installation program may be stored in the storage medium.

The functions according to the present embodiment described in FIGS. 7 and 11 may be achieved by a host computer that executes an externally installed program. In such a case, the program and the associated data may be supplied to the host computer using a storage medium, such as a CD-ROM (compact disk-read only memory), a flash memory, or an FD (floppy disk), or an external storage medium via a network.

In this way, the storage medium stores the software program code that achieves the functions of the above-described exemplary embodiments. The storage medium is supplied to a system or an apparatus. The present invention can be achieved by causing a computer (central processing unit (CPU) or micro-processing unit (MPU)) of the system or apparatus to read and execute the software program code.

In such a case, the program code itself read out of the storage medium realizes the functions of the above-described embodiments. Therefore, the storage medium storing the program code can also realize the present invention.

Accordingly, any form of the program can be applied to the present invention. For example, the program may be a program executed using an object code or an interpreter, or script data supplied to the OS.

Examples of the storage medium for supplying the program code include a floppy disk, a hard disk, an optical disk, an MO (magnetooptical disk), a CD-ROM, a CD-R (CD recordable), a CD-RW (CD-rewritable), a magnetic tape, a nonvolatile memory card, a ROM, and a DVD (digital versatile disc).

Alternatively, the program code may be supplied by accessing a Web page on the Internet using a browser in a client computer and downloading the computer program of the present invention or an archive file including an auto-install function from the Web page to a recording medium, such as a hard disk. In addition, the program code of the program of the present invention may be divided into a plurality of files, which may be downloaded from different Web pages. In other words, a WWW (world wide web) server and an FTP (file transfer protocol) server that allow a plurality of users to download a program file that achieves the functions of the present invention are also included in the present invention.

Additionally, the program according to the present invention can be encrypted and stored into a storage medium, such as a CD-ROM, to deliver it to users. A user who satisfies a predetermined criterion can download key information for decrypting the encryption from a Web page on the Internet. By using the key information, the user can install the encrypted program in a computer and can execute the program to achieve the present invention.

The functions of the above-described embodiments can be realized by another method in addition to executing the program code read out by the computer. For example, the functions of the above-described embodiments can be realized by a process in which an operating system (OS) running on the computer executes some of or all of the functions in the above-described embodiments under the control of the program code.

The present invention can also be achieved by writing the program code read out of the storage medium to a memory of an add-on expansion board of a computer or a memory of an add-on expansion unit connected to a computer. The functions of the above-described embodiments can be realized by a process in which, after the program code is written, a CPU in the add-on expansion board or in the add-on expansion unit executes some of or all of the functions in the above-described embodiments under the control of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-344395 filed Dec. 21, 2006, which is hereby incorporated by reference herein in its entirety.

What is claimed is:

1. An image communication apparatus capable of communicating with external apparatuses, comprising:

a receiving unit configured to receive image data, which is originally addressed to a second external apparatus, from a first external apparatus, under a condition in which an address of the image communication apparatus is registered in an SIP server as an alternative address of the second external apparatus;

a storage unit configured to store the image data received by the receiving unit;

an inquiring unit configured to send an inquiry requesting an address of the second external apparatus to the SIP server;

a determination unit configured to determine, based on a response to the inquiry by the inquiring unit, whether the second external apparatus is in a state in which the second external apparatus is able to receive image data; and a transmission unit configured to transmit the image data stored in the storage unit to the second external apparatus in a case where the determination unit determines that the second external apparatus is in the state in which the second external apparatus is able to receive image data.

2. The image communication apparatus according to claim 1, wherein the inquiring unit performs the inquiry at predetermined intervals.

3. The image communication apparatus according to claim 1, wherein when the response to the inquiry by the inquiring unit indicated that a TO address and a URI address are the same, the determination unit determines that the second external apparatus is in the state in which the second external apparatus is able to receive image data.

4. A method for controlling an image communication apparatus capable of communicating with external apparatuses, the method comprising:

receiving image data, which is originally addressed to a second external apparatus, from a first external apparatus, under a condition in which an address of the image communication apparatus is registered in an SIP server as an alternative address of the second external apparatus;

storing the received image data in a storage unit;

determining, based on a response to the inquiry, whether the second external apparatus is in a state in which the second external apparatus is able to receive image data; and transmitting the stored image data to the second external apparatus in a case where it is determined that the second external apparatus is in the state in which the second external apparatus is able to receive image data.

* * * * *